United States Patent
Rudolf-Bauer

(12) 
(10) Patent No.: US 6,186,691 B1
(45) Date of Patent: Feb. 13, 2001

(54) LINEAR JOINING AND SEALING DEVICE

(76) Inventor: Klaus Rudolf-Bauer, Panamericana Norte, Cuenca (EC)

( * ) Notice: Under 35 U.S.C. 154(b), the term of this patent shall be extended for 0 days.

(21) Appl. No.: 09/173,496

(22) Filed: Oct. 15, 1998

(51) Int. Cl.[7] ................................................. F16B 7/00
(52) U.S. Cl. ........................... 403/31; 403/381; 403/297; 403/5
(58) Field of Search ............................. 403/381, 31, 34, 403/288, 297, 5

(56) References Cited

U.S. PATENT DOCUMENTS

| | | | |
|---|---|---|---|
| 187,962 | * | 3/1877 | Cantrell .................. 403/297 X |
| 713,679 | * | 11/1902 | Pfeil et al. ................ 403/381 X |
| 1,743,492 | * | 1/1930 | Sipe ........................ 403/297 |
| 2,342,732 | | 2/1944 | Gudmundsen . |
| 2,342,866 | | 2/1944 | Jakosky . |
| 2,359,629 | | 10/1944 | Dexter et al. . |
| 2,415,560 | | 2/1947 | Higley . |
| 2,644,553 | * | 7/1953 | Cushman ...................... 403/5 |
| 2,870,881 | * | 1/1959 | Rogge ........................ 403/5 |
| 3,040,393 | | 6/1962 | Dailey . |
| 3,074,520 | * | 1/1963 | Grubelich .................... 403/5 |
| 3,986,429 | * | 10/1976 | Busler .................... 403/297 X |
| 4,013,372 | * | 3/1977 | Lay et al. ............... 403/297 X |
| 4,176,981 | * | 12/1979 | Clapper et al. .............. 403/31 |
| 4,447,171 | * | 5/1984 | Baldoni et al. .............. 403/381 |
| 4,599,837 | * | 7/1986 | Wrightman .............. 403/297 X |
| 4,639,158 | * | 1/1987 | Jones ........................ 403/31 |
| 4,652,170 | * | 3/1987 | Lew ........................ 403/381 |
| 4,756,639 | * | 7/1988 | Hoshino .................. 403/297 |
| 4,954,017 | | 9/1990 | Davis et al. . |
| 4,958,953 | * | 9/1990 | Charondiere .............. 403/297 |
| 5,089,215 | | 2/1992 | Landgraf et al. . |
| 5,090,835 | * | 2/1992 | Cox ...................... 403/381 X |
| 5,287,852 | | 2/1994 | Arkinstall . |
| 5,411,083 | * | 5/1995 | Freiburger ................ 403/31 X |
| 5,531,539 | * | 7/1996 | Crawford .................. 403/381 |
| 5,584,154 | * | 12/1996 | Koepke et al. .......... 403/288 X |
| 5,855,446 | * | 1/1999 | Disborg .................... 403/5 X |

FOREIGN PATENT DOCUMENTS

2659560 * 7/1978 (DE) ........................... 403/5

* cited by examiner

Primary Examiner—Lynne H. Browne
Assistant Examiner—John R. Cottingham
(74) Attorney, Agent, or Firm—Gene Scott-Patent Law & Venture Group

(57) ABSTRACT

A linear joining and locking device comprises a first receiver member providing a first closure surface thereon and a first linear cavity therein, the first closure surface communicating with the first linear cavity along a first linear aperture defined in the first receiver member; a second receiver member providing a linear sealing mounting device; the first closure surface being positionable for aligning the first linear aperture in mutual linearly corresponding adjacency with the linear sealing device mounting device; an elongate linear elastomeric sealing device engaged within the first linear cavity and the linear sealing device, and extensive therebetween; the sealing device providing a first linear channel therein, the linear channel responsive to fluid pressure for expanding the sealing device within the linear cavity so as to enable the first and second receiver members to be mechanically joined when desired.

9 Claims, 1 Drawing Sheet

LINEAR JOINING AND SEALING DEVICE

BACKGROUND OF THE INVENTION

1. Field of the Invention

This invention relates generally to portal sealing means, and more particularly to a device and its method of use for sealing the small opening between two surfaces such as a door and its frame. The device provides sealing as well as a structural support means with great strength and may be quickly disengaged for moving one or both of the engaged elements.

2. Description of Related Art

The following art defines the present state of this field:

Landgraf et al., U.S. Pat. No. 5,089,215 describes a method of securing a cylindrical centering pin for a nuclear fuel assembly in a bore formed in a plate includes introducing an end of the centering pin into the bore until at least part of a coaxial, radially expandable wall portion of the end to be secured protrudes beyond the plate; an generating pressure in a closed hollow space surrounded by the wall portion with a pressure fluid until the wall portion radially expands and anchors the centering pin. According to another method, the end is introduced into the bore until at least part of the end to be secured, which has a periphery and an interior with radial slits formed therein, protrudes beyond the plate; and a mandrel-like tool is partially brought into the slits in the interior of the end of the centering pin and radially expands the end of the centering pin with the tool for anchoring the centering pin.

Davis et al., U.S. Pat. No. 4,954,017 describes an expansion bolt, adapted to be anchored in a hole, having a hollow shank portion adapted to hold a pressurizing fluid and to expand girthwise on pressurization of the fluid, and further having a threaded portion adapted on insertion of the shank portion in the hole extend out of the hole and to have a nut threaded thereon, whereby, following insertion of the shank portion of the bolt, in an unexpanded condition, in the hole, the shank portion may be expanded by presssurization of fluid therein for anchoring it in the hole and the nut threaded up on the threaded portion of the bolt.

Arkinstall, U.S. Pat. No. 5,287,852 describes a releasably anchorable bushing conduit apparatus for providing access through a wall having a generally accessible side and a generally inaccessible side and an opening extending through the wall from the generally accessible side to the generally inaccessible side comprises a bushing conduit having first and second opposite end portions with first and second coterminous openings therein. The bushing conduit is insertable into the opening such that the first end portion protrudes from the wall on the inaccessible side and the second end portion protrudes from the wall on the accessible side. A retaining device external to the first and second coterminous openings retains the bushing conduit in place, yet presents no obstruction to the first and second coterminous openings. The retaining device includes an expandable and collapsible member secured to the first end portion and capable of expanding to interfere with the inaccessible side to prevent the first end portion from being withdrawn from the opening from the accessible side. The expandable and collapsible member is also capable of being collapsed to prevent interence of the member with the inaccessible side to permit the first end portion to be withdrawn from the opening. A device is provided on the bushing conduit for squeezing the wall between the expandable member and the second end portion to hold the bushing conduit securely in the wall opening.

Gudmundsen, U.S. Pat. No. 2,342,732 relates to rivets and riveting to provide a novel rivet and method of setting the same which obviates the need for holding an anvil against the head of the rivet during the riveting operation and instead permits the setting operation to be completed entirely from in front of the work.

Higley, U.S. Pat. No. 2,415,560 relates to rivets of the fluid expansion type and more particularly to a rivet in which pressures may be generated internally of the rivet through the application of an initial fluid pressure and a mechanical pressure. The invention further contemplate the new and improved method of binding a rivet of this type. An important object of the invention is to exert in a rivet of the fluid expansion type an initial internally generated fluid pressure outwardly of the rivet effective to expand the rivet and also to exert a cooperating pressure along the rivet. Another object of the invention is to bind a rivet of the above mentioned type by the application of a pressure consisting of an initial fluid pressure and a cooperating mechanical pressure ends effectively greater. It is also an object of the invention to provide a simple and inexpensive rivet construction by which the foregoing objects may be carried out.

Jakosky, U.S. Pat. No. 2,342,866 relates to hollow rivets which are set or expanded by hydraulic pressure within the rivet. Such rivets have a hollow shank closed at its set-end and constituting a hydraulic pressure chamber which is open through the head of the rivet. Hydraulic pressure is supplied through the head to expand the shank into tight contact with the rivet hole and to form a head on the projecting or set-end of the shank. This is achieved by stretching the wall of the shank. Such rivets are highly satisfactory for many uses but these uses are limited on the one hand by the relatively low strength in shear of the hollow shanks and on the other hand by the pressures which can readily be applied by hand tools or to delicate parts being riveted to expand the shanks the requisite amount. It is among the objects of the present invention to increase the shear strength of hollow rivets and to reduce the pressure which is needed to set rivets of a give strength.

Dexter et al., U.S. Pat. No. 2,359,629 relates to hollow rivets which are set or expanded by the pressure of liquid forced into the rivet by a pressure-applying tool. This invention provides an improved hydraulically expanded rivet in which expansion of the shank to fill the hole is assured and to provide a rivet which expands more nearly uniformly outside of the rivet hole to form a strong symmetrical head free of rupture. The invention also provides a rivet which exerts a greater axial compressive force on the plates or objects to be riveted than previously known hydraulic rivets and thus provides a tighter joint. This is important in the construction of fluid-tight containers.

Dailey, U.S. Pat. No. 3,040,393 provides an elongated member, in particular a ring of the character described which is economical to construct efficient in operation and which is characterized by the facility with which it may be mounted in operating position. More specifically it provides an endless annular, elongated sealing or like member formed of yieldable resilient material and adapted to be mounted on support structure including means defining a narrow elongated opening also annular in character, the member having provision to control the direction of collapse of the tube when evacuated for insertion in the opening. The present invention also provides useful articles such for example as self locking filler strips, sealing strips, refrigerator door seals, joining strips, glass mounting channels, water deflector seals, trunk seals or the like, all characterized by the inclusion of elongated collapsible tubular portions having means for controlling the direction of collapse of the tube when evacuated to facilitate insertion of the tubular portion in the opening of the support structure.

The prior art teaches the use of expandable elements for enabling the tight fitting of rivets and other fasteners. An important reference, V. D. Dailey, teaches the use of vacuum for enabling the fitting of a contracting element. However, the prior art does not teach that an elongated and linear element may be fitted for engaging two structural elements and may be expanded or contracted by a fluid as necessary for the assurance of the desired relationship between these elements. The present invention fulfills these needs and provides further related advantages as described in the following summary.

SUMMARY OF THE INVENTION

The invention is a connection assembly and sealing profile/joint which becomes effective through expansion. Its connective and sealing effects are achieved by the force of pressure within an elastic hollow member which is able to conform to the groove, slot or other feature into which it is placed. Hydraulic or pneumatic pressure means may be employed and may be temporary or permanent. The distinguishing feature of the invention is a closing effect produced by the application of fluid pressure in an elastic tube or hose whereby the tube or hose conforms to the surfaces surrounding it thereby achieving a strong connection therewith. Applications include sealing and locking doors and other portals, creation of a flexible hinge mechanism as for doors, aircraft wing flaps and other similar applications, and as an interconnection medium for flexible belts, chains and other drive links.

The present invention teaches certain benefits in construction and use which give rise to the objectives described below.

The present invention provides a linear joining device comprising a first receiver member providing a first closure surface thereon and a first linear cavity therein, the first closure surface communicating with the first linear cavity along a first linear aperture defined in the first receiver member; a second receiver member providing a linear sealing means mounting means; the first closure surface being positionable for aligning the first linear aperture in mutual linearly corresponding adjacency with the linear sealing means mounting means; an elongate linear elastomeric sealing means engaged within the first linear cavity and the linear sealing means, and extensive therebetween; the sealing means providing a first linear channel therein, the linear channel responsive to fluid pressure for expanding the sealing means within the linear cavity so as to enable the first and second receiver members to be mechanically joined when desired.

The invention is a connection assembly and sealing profile/joint which becomes effective through expansion. Its connective and sealing effect is achieved by impact of pressure within an elastic hollow member which is able to conform to the groove, slot or other feature into which it is placed. Hydraulic or pneumatic pressure means may be employed and may be temporary or permanent. The distinguishing feature of the invention is that of a closing effect produced by the application of fluid pressure in an elastic tube or hose whereby the tube or hose conforms to the surfaces surrounding it thereby achieving a strong connection therewith. Applications include sealing doors and other portals, creation of a flexible hinge mechanism as for doors, aircraft wing flaps and other similar applications, and as a interconnection medium for flexible belts, chains and other drive links. Applications include manufacture of automobiles, aircraft and ships, satellite systems, steel and concrete construction, erection of homes and buildings, bridge and road construction. The important advantage of the invention is in weight savings, flexibility, easy maintenance and low cost. For example, typical doors are interconnected with their surrounding structure by hinges and door locks, a relatively few points of contact. Application of the present invention can result in a continuous interconnection between door and frame. This is an important consideration in that the interconnectedness may be constructed so as to receive shock loads without deformation, may be formed fluid tight so as to prevent gases and liquids from passing and may be easily replaced when necessary without undue expense.

A primary objective of the present invention is to provide a closure and interconnection means having advantages not taught by the prior art.

An alternate objective is to provide such a closure-interconnection means enabled for providing closure between primary structural rigid members over an extensive linear runway including sealing of entire perimeters.

Another objective is to provide such a closure-interconnection means enabled for providing control of the tightness of fit between the primary structural elements involved.

A further objective is to provide such a closure-interconnection means enabled for providing repetitive closures and openings.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
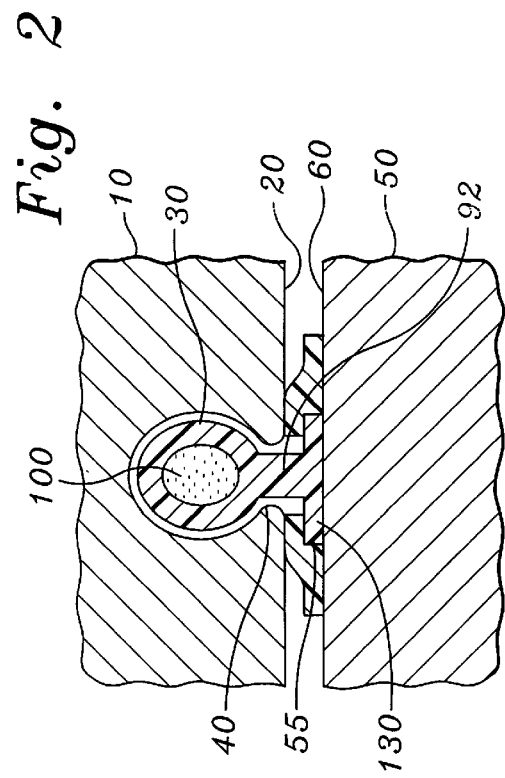
FIG. 1 is a sectional view of a first preferred embodiment of the present invention.

The above described drawing figures illustrate the invention, a linear joining and sealing device which will be referred to simply as a joining device herein. The linear joining device, in a first embodiment shown in FIG. 1, comprises a first receiver member 10 preferably of a rigid structural material such as wood, metal or plastic, providing a first closure surface thereon 20 and a first linear cavity therein 30, the first closure surface 20 communicating with the first linear cavity 30 along a first linear aperture 40 defined in the first receiver member 10 and may be as long as desired and may close upon itself; a second receiver member 50 providing a second similar closure surface 60 thereon and a second linear cavity 70 therein, the second closure surface 60 communicating with the second linear cavity 70 along a second linear aperture 80 defined in the second receiver member 50 in the same manner as described above; the first and second closure surfaces 20, 60 being positionable for aligning the first and second linear apertures 40, 80 in mutual linearly corresponding adjacency as shown in FIG. 2 such as in the case of a door and door frame for instance; an elongate linear elastomeric sealing means 90, made of a material with at least some resiliency and shape memory such as a rubber, a rubberized plastic or related materials which are well documented in the art, engaged within the first and second linear cavities 30, 70 and extensive therebetween; the sealing means 90 providing a first 100 and a second 110 mutually parallel linear channels therein, the linear channels 100, 110 responsive to fluid pressure for expanding (see FIG. 2) the sealing means 90 within the linear cavities 30, 70, the first linear channel 100 responsive for engaging the sealing means 90 within the first linear cavity 30 and the second linear channel 110 responsive for engaging the sealing means 90 within the second linear cavity 70 so as to enable the first and second receiver members 10, 50 to be mechanically joined and interconnected when desired.

Figure 2:
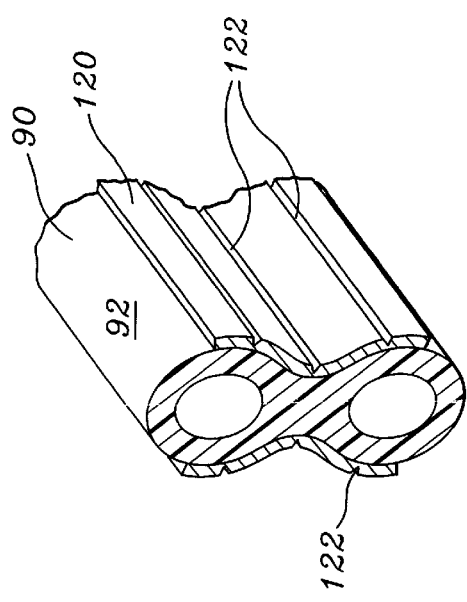
FIG. 2 is a sectional view of a second preferred embodiment of the present invention.

In a Second embodiment, shown in FIG. 2, the device comprises a first receiver member 10 providing a first closure surface 20 thereon and a first linear cavity therein 30, the first closure surface 20 communicating with the first linear cavity 30 along a first linear aperture 40 defined in the first receiver member 10; a second receiver member 50 providing a linear sealing means mounting means 55; the first closure surface 20 being positionable for aligning the first linear aperture 40 in mutual linearly corresponding adjacency with the linear sealing means mounting means 55; an elongate linear elastomeric sealing means 90 engaged within the first linear cavity 30 and the linear sealing means mounting means 55, and extensive therebetween; the sealing means 90 providing a first linear channel therein 100, the linear channel responsive to fluid pressure for expanding the sealing means 90 within the linear cavity 30 so as to enable the first and second receiver members 10, 50 to be mechanically joined when desired. The sealing means mounting means 55 may be any mechanical clamping device capable of supporting and anchoring the sealing means 90 on a second closure surface 60 of the second receiver member 50. As shown in FIG. 2, the sealing means 90 may be formed with a flange 130 for mechanical mounting under the clamping device 55. In the embodiment shown in FIGS. 1 and 2, the sealing device 90 might be used to seal a door as referenced by numeral 10, to a bulkhead, as referenced by numeral 50. Such a seal may extend fully about the door's perimeter for an airtight seal.

When the medial portion 92 of sealing means 90 is of sufficient length, the sealing means 90 is able to function efficiently as a hinge whereby fluid pressure is used to expand sealing means 90 within one or two of the linear cavity so as to form an integral assembly as shown in FIG. 2. It is clear that a fluid may be used for the expansion of the sealing means 90 such that upon curing the assembly is permanent and not dismountable without destruction of the components.

Preferably, the sealing means 90 further comprises an exterior surface layer 120 of a structural material, the exterior surface layer 120 being integral with an exterior surface 92 of the sealing means 90, the exterior surface layer 120 being adapted so as to be flexible with the sealing means 90. This is achieved when the exterior surface layer 120 provides a linear means for flexing 122 so as to enable the sealing means 90 to change shape. Such a linear means for flexing 122 preferably comprises a plurality of linear grooves or may simply be a structural yet flexible material such as a spring steel sheet.

Figure 3:
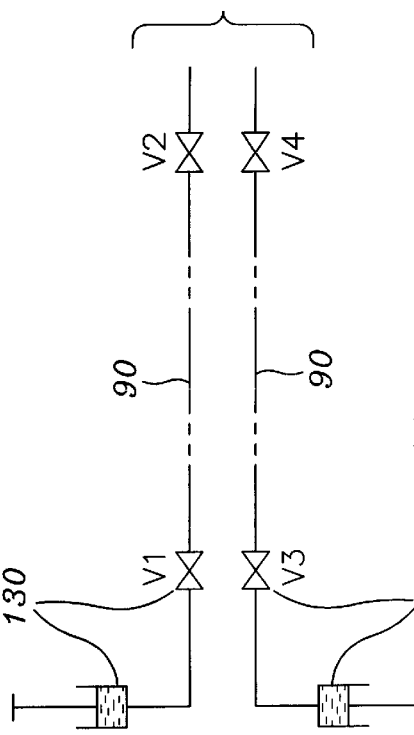
FIG. 3 is a sectional and extended perspective view of a clad expandable element thereof.
Figure 4:
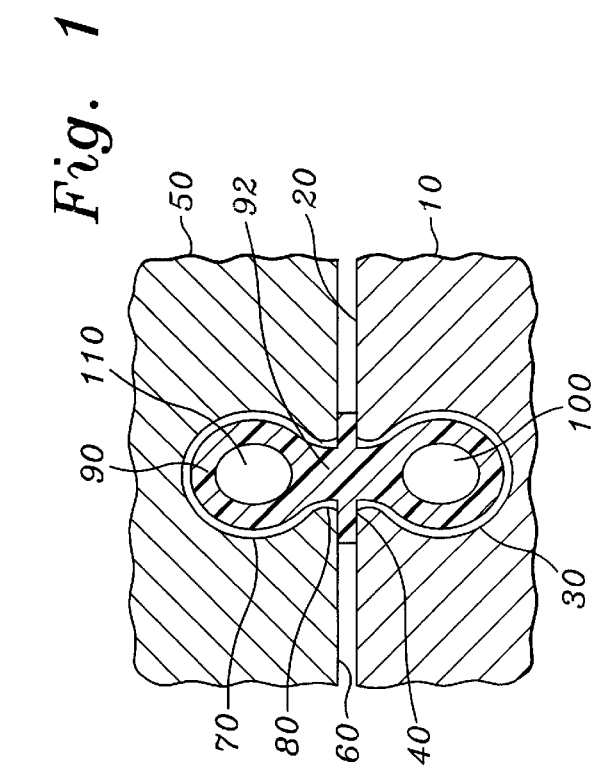
FIG. 4 is a schematic diagram showing a means for control of the expandable element thereof.

As shown schematically in FIG. 4, the device preferably further includes a means for injecting 130 a fluid into the first, and or second linear cavity 100, 110, such as a pump or pressure cylinder used in conjunction with an inlet valve (shown as V1 and V3 in FIG. 4), and a means for exhausting the fluid from the linear channels 100, 110 such as an outlet valve (shown as V2 and V4 in FIG. 4). Valves V1 and V3 are preferably solenoid actuated valves with a back-flow inhibiting feature as is well known in the art. Valves V2 and V4 are common solenoid actuated exhaust valves as are also well known in the art.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A linear joining device comprising:
   a first receiver member providing a first closure surface thereon, the first closure surface providing a first linear cavity therein, the first closure surface communicating with the first linear cavity along a first linear aperture defined in the first closure surface;
   a second receiver member providing a planar second closure surface supporting a clamping device;
   the first closure surface being positionable for aligning the first linear aperture in mutual linearly corresponding adjacency with the clamping device;
   an elongate linear elastomeric sealing means engaged within the first linear cavity and rigidly held against the planar second closure surface by the clamping device, the sealing means extensive therebetween;
   the sealing means providing a first linear channel therein, the linear channel responsive to fluid pressure for expanding the sealing means within the linear cavity so as to enable the first and second receiver members to be disengagably mechanically joined.

2. The device of claim 1 wherein the sealing means further comprises an exterior surface layer of a structural material, the exterior surface layer being integral with an exterior surface of the sealing means, the exterior surface layer providing a plurality of linear longitudinal grooves so as to enable the exterior surface layer to flex with the sealing means.

3. The device of claim 1 further comprising a means for injecting a fluid into the first linear cavity, and a means for exhausting the fluid from the first linear cavity.

4. The device of claim 1 wherein a medial portion of the sealing means is of sufficient length to function as a hinge.

5. The device of claim 1 further including a fluid enabled for hardening upon curing so as to form a permanent interconnection between the first and the second receiver members.

6. A linear joining device comprising:
   a first receiver member providing a first closure surface thereon, the first closure surface providing a first linear cavity therein, the first closure surface communicating with the first linear cavity along a first linear aperture defined in the first closure surface;
   a second receiver member providing a second closure surface thereon, the second closure surface providing a second linear cavity therein, the second closure surface communicating with the second linear cavity along a second linear aperture defined in the second receiver member;

the first and second closure surfaces being positionable for aligning the first and second linear apertures in mutual linearly corresponding adjacency;

an elongate linear elastomeric sealing means engaged within the first and second linear cavities and extensive therebetween;

the sealing means providing a first and a second mutually parallel linear channels therein, the linear channels responsive to fluid pressure for expanding the sealing means within the linear cavities, the first linear channel responsive to fluid pressure for engaging the sealing means within the first linear cavity and the second linear channel responsive to fluid pressure for engaging the sealing means within the second linear cavity so as to enable the first and second receiver members to be disengagably mechanically joined;

the sealing means further comprising an exterior surface layer of a structural material, the exterior surface layer being integral with an exterior surface of the sealing means, a linear means for flexing comprises a plurality of linear grooves so as to enable the exterior surface layer to flex with the sealing means.

7. The device of claim 6 further comprising a means for injecting a fluid into the first and second linear cavities, and a means for exhausting the fluid from the first and second linear cavities.

8. The device of claim 6 wherein a medial portion of the sealing means is of sufficient length to function as a hinge.

9. The device of claim 6 further including a fluid within the linear channels, the fluid being enabled for hardening upon curing so as to form a permanent interconnection between the first and the second receiver members.

* * * * *

UNITED STATES PATENT AND TRADEMARK OFFICE
CERTIFICATE OF CORRECTION

| | |
|---|---|
| PATENT NO. | : 6,186,691 B1 |
| DATED | : February 13, 2001 |
| INVENTOR(S) | : Klaus Rudolf-Bauer |

It is certified that error appears in the above-identified patent and that said Letters Patent is hereby corrected as shown below:

<u>Title page,</u>
Item [76], Inventor, replace "Klaus Rudolf-Bauer, Panamericana Norte, Cuenca (EC)" with -- Klaus Rudolf-Bauer, Dept. of Transport Road Safety, Private Bag 0054, Gaborne, Botswana --.

Signed and Sealed this

Eleventh Day of December, 2001

*Attest:*

*Attesting Officer*

NICHOLAS P. GODICI
*Acting Director of the United States Patent and Trademark Office*